United States Patent

[11] 3,572,884

[72] Inventor John Balan Chirayath
Amherst, N.Y.
[21] Appl. No. 830,639
[22] Filed June 5, 1969
[45] Patented Mar. 30, 1971
[73] Assignee American Optical Corporation
Southbridge, Mass.

[54] PROJECTION MICROSCOPE
1 Claim, 4 Drawing Figs.
[52] U.S. Cl............................................. 350/9,
350/18, 350/34, 350/91, 353/39
[51] Int. Cl............................................. G02b 21/22,
G02b 21/36
[50] Field of Search........................................ 350/9, 18,
34—36, 87; 353/39

[56] References Cited
UNITED STATES PATENTS

| 1,920,183 | 8/1933 | Bossing............................ | 353/39 |
| 2,209,532 | 7/1940 | Michel............................. | 350/9 |
| 2,363,388 | 11/1944 | Boughton et al.................. | 353/39XA |
| 2,578,013 | 12/1951 | Monk.............................. | 350/34 |

*Primary Examiner*—David H. Rubin
*Attorneys*—William C. Nealon, Noble S. Williams and Robert J. Bird

ABSTRACT: A stereoscopic microscope having an illuminator disposed in one optical path and a projection lens and screen in the other. The illuminator provides light through one optical path to the object plane, from which it reflects along the other optical path. The projection lens projects a greatly magnified image onto the screen for viewing without conventional eyepieces.

PATENTED MAR 30 1971 3,572,884

INVENTOR.
JOHN B. CHIRAYATH

BY Robert J. Bird
ATTORNEY

PROJECTION MICROSCOPE

BACKGROUND OF THE INVENTION

The present invention is related to microscopes in general and, in particular, to a microscope being adapted to have a projection lens and projection screen as an alternative to a conventional eyepiece, for ease in viewing the image.

Projection microscopes are known in the prior art. They generally are special purpose instruments providing an image which can be seen only on a projection screen.

It is an object of the present invention to provide a stereoscopic microscope which is adaptable for use with eyepieces or a projection screen.

Another object is to provide a projection microscope avoiding the use of beam splitters in order to maximize the light transmitted to the projection screen.

Other objects, advantages, and features will become apparent from the following description of one embodiment thereof when taken in connection with the accompanying drawing.

SUMMARY OF THE INVENTION

Briefly, the present invention is practiced in one form by a stereoscopic microscope adapted to accommodate an illuminator in one optical path (the light path). Light from the illuminator is directed through this optical path to the object and is reflected therefrom through the other optical path. A projection lens is included in addition to a conventional eyepiece in the other optical path (the projection path) and a mirror is movable in the projection path to render the microscope alternatively a conventional or a projection microscope. A projection screen is positioned relative to the projection lens.

DRAWINGS

DESCRIPTION

Figure 1:
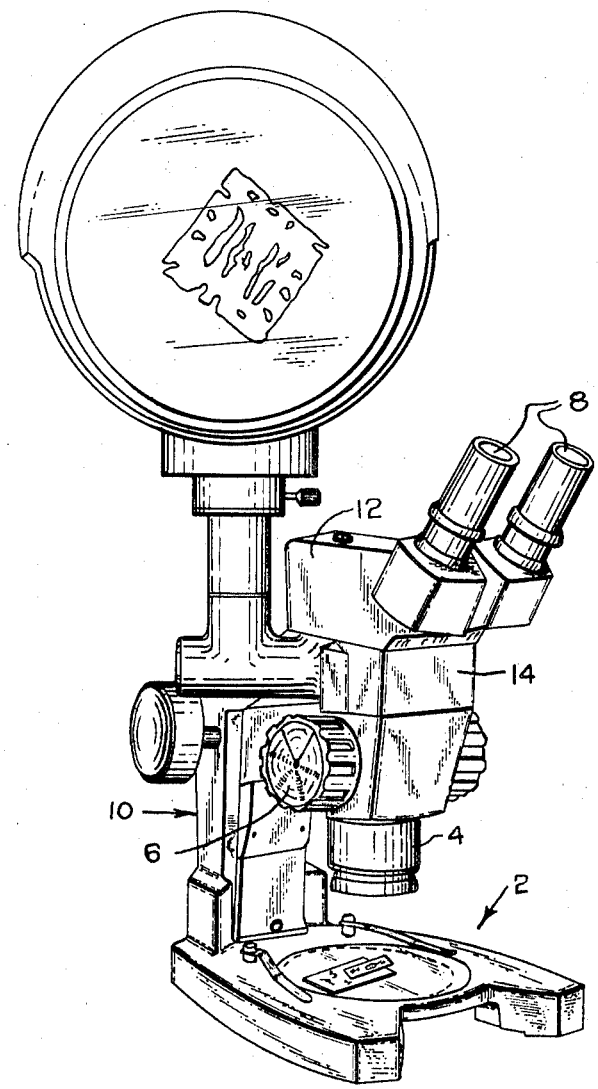
FIG. 1 is a perspective view of a stereoscopic microscope including my invention and with conventional eyepieces.

Referring now to FIG. 1, a stereo microscope is generally indicated at 2 and includes an objective 4, a rotatable turret 6, and a pair of twin eyepieces 8, all of which members are mounted relative a frame, generally indicated at 10. Such a microscope by itself is known to the prior art and is described in detail in U.S. Pat. No. 2,901,943, issued to Robert B. Tackaberry. In addition to such a microscope, the present apparatus includes an adapter member 14.

Figure 2:
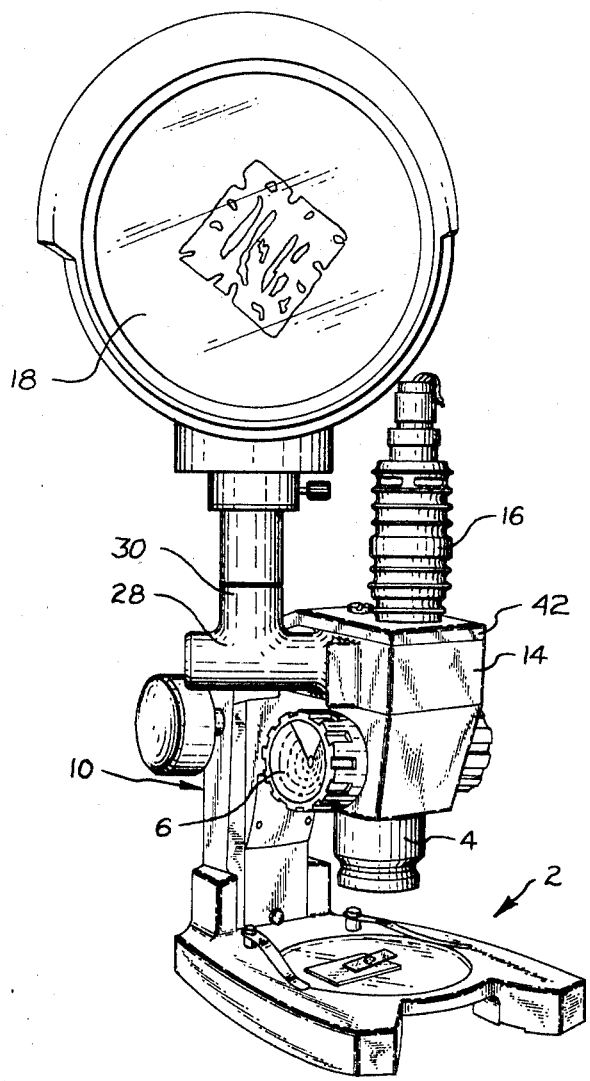
FIG. 2 is a perspective view of a stereoscopic microscope including my invention and in which the eyepieces are replaced by an illuminator.

Referring now to FIG. 2, in general the same microscope 2, objective 4, rotatable turret 6, adapter 14, and frame 10 are shown. In the place of eyepieces 8 and their associated housing 12, an illuminator 16 is mounted relative to the adapter 14. A projection screen 18 is mounted relative to adapter 14 in both the FIG. 1 and FIG. 2 configurations.

Figure 3:
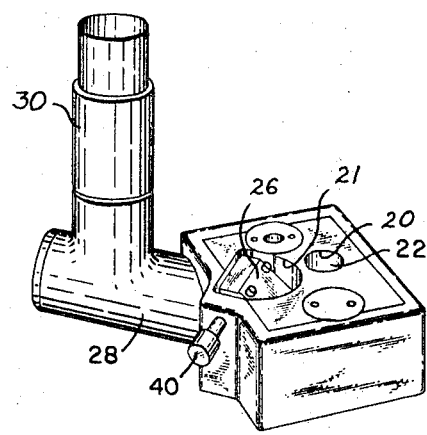
FIG. 3 is a perspective view of an adapter portion of the apparatus shown in FIGS. 1 and 2.

In FIG. 3, a projector adapter 14 is shown individually. It includes two optical path apertures 20 and 21 which correspond to the optical paths of the microscope and which, in the projection microscope, form a part of light path 22 and projection path 24. A mirror 26 is disposed in projection path 24 and is pivotally mounted on a spindle 40 which extends through the body of adapter 14 for external control. By use of spindle 40, mirror 26 can be swung into alternate positions. Adapter 14 further includes a horizontal projection tube 28 and a vertical projection tube 30, both such tubes defining a part of the projection path 24. A mirror 32 is disposed in the projection path 24 at the juncture of projection tubes 28 and 30. Projection tube 30 includes a projection lens 38 in the projection path 24.

In one of its alternate positions, mirror 26 is swung clear leaving aperture 21 clear, permitting light from the object to enter the corresponding eyepiece 8 for conventional microscopy. In its other position, mirror 26 is swung into path 24 to direct light to tube 28 and to the screen 18.

Figure 4:
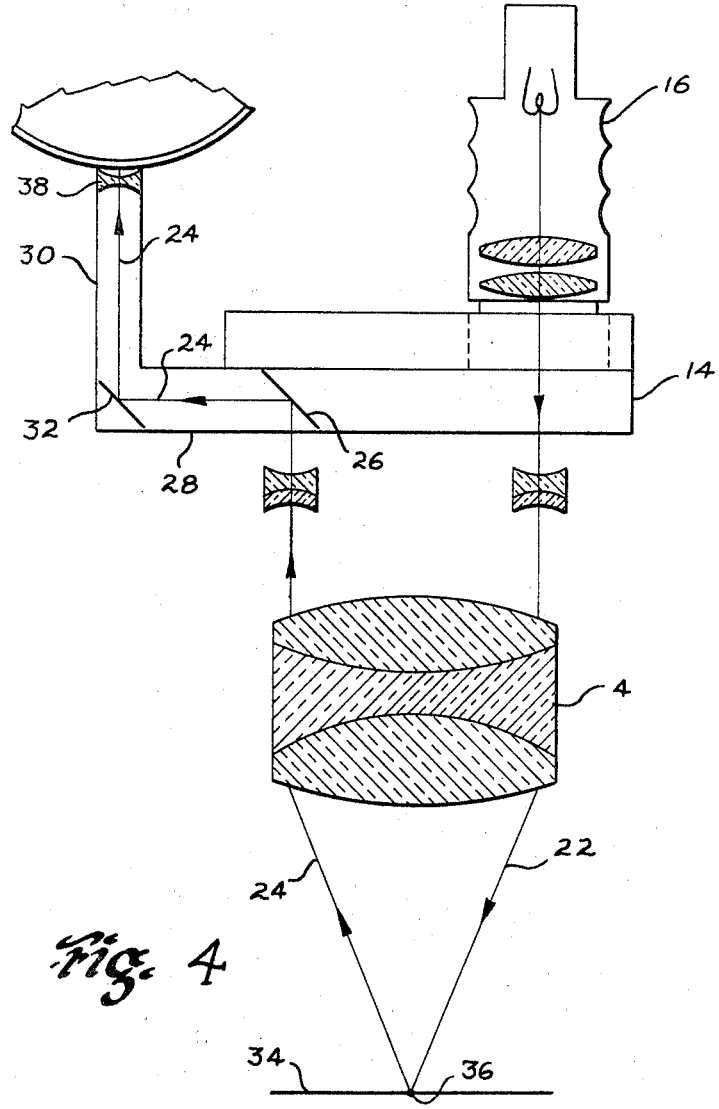
FIG. 4 is a schematic view of the optical system of the stereoscopic microscope shown in FIG. 2.

FIG. 4 shows schematically the optical elements and optical paths of the projection microscope of the present invention. The optical system is shown related to an object plane 34 on which is disposed an object at 26 to be examined.

By comparison of FIGS. 1 and 2, it will be appreciated that the difference between the FIG. 1 use as a conventional microscope and the FIG. 2 use as a projection microscope is simply the removal of housing 12 and its associated eyepieces 8 from adapter 14 and the attachment of illuminator 16 to adapter 14. In connecting illuminator 16, as in FIG. 2, a cover plate 42 fits over adapter 14 and covers the aperture 21.

In operation, when lamp 16 is illuminated, light therefrom is directed along light path 22 through objective 4 and onto object plane 34. The light reflects from object plane 34, and from object 36, along projection path 24 and through objective 4. Mirrors 26 and 32 direct this light along the projection path 24 to projection lens 38. Projection lens 38 thereupon projects the light and the image of object 36 onto viewing screen 18 where it can be seen greatly magnified and without the use of conventional eyepieces. By simply tilting mirror 26 to its alternate position and replacing the lamp by the eyepiece housing, the microscope can be used conventionally.

It will be apparent that by means of the present invention a microscope has been provided which is adaptable for use conventionally with eyepieces or alternatively as a projection microscope. Furthermore, it will be appreciated that as a projection microscope, the present invention avoids the use of beam splitters and thus maximizes the light transmitted to the projection screen.

It may occur to others of ordinary skill in the art to make modifications of the present invention which will lie within the concept and scope thereof and will not constitute a departure therefrom. Accordingly, it is intended that the invention be not limited by the details in which it has been described, but that it encompass all within the purview of the following claims.

I claim:

1. In a stereoscopic microscope having objective lens means providing first and second optical viewing paths converging at an object plane, a body portion having apertures corresponding to said first and second optical viewing paths, and a binocular eyepiece assembly detachably mounted on said body portion with the eyepieces aligned with the respective optical viewing paths; a projection adapter including a housing detachably mounted between said body portion and said binocular eyepiece assembly, said housing having first and second apertures corresponding to said first and second optical viewing paths and having a third aperture intersecting said first housing aperture and defining a projection light path to a projection screen supported from said housing in offset relationship, a mirror pivotally mounted in said first housing aperture and having a control handle extending externally of said housing to selectively direct light to one of the binocular eyepieces and to the projection screen, and a light source unit for detachable mounting on said housing in alignment with said second housing aperture when said binocular eyepiece assembly is removed for illuminating the object plane through said second optical path.